United States Patent
Amikura

(10) Patent No.: US 9,778,699 B2
(45) Date of Patent: Oct. 3, 2017

(54) STRING-ATTACHED INPUT AND PORTABLE ELECTRONIC DEVICE

(71) Applicant: CASIO COMPUTER CO., LTD., Shibuya-ku (JP)

(72) Inventor: Ryo Amikura, Setagaya (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 51 days.

(21) Appl. No.: 14/845,164

(22) Filed: Sep. 3, 2015

(65) Prior Publication Data

US 2016/0070375 A1 Mar. 10, 2016

(30) Foreign Application Priority Data

Sep. 8, 2014 (JP) .................... 2014-181904

(51) Int. Cl.
| G06F 3/0354 | (2013.01) |
| G06F 1/16 | (2006.01) |
| A45F 5/00 | (2006.01) |
| A45C 11/00 | (2006.01) |

(52) U.S. Cl.
CPC .............. *G06F 1/1656* (2013.01); *A45F 5/00* (2013.01); *A45C 2011/003* (2013.01); *A45F 2005/006* (2013.01); *A45F 2200/0525* (2013.01); *A45F 2200/0566* (2013.01); *G06F 2200/1632* (2013.01)

(58) Field of Classification Search
CPC ........... G06F 2200/1632; G06F 1/1656; A45F 2005/006; A45C 2011/003
See application file for complete search history.

(56) References Cited

U.S. PATENT DOCUMENTS

| 5,756,941 A * | 5/1998 | Snell .................... G06F 1/1626 178/19.01 |
| 2003/0067452 A1* | 4/2003 | Liu ........................ G06F 1/1626 345/179 |
| 2006/0290686 A1 | 12/2006 | Shimizu et al. |
| 2011/0018843 A1* | 1/2011 | Ogawa .................... G02F 1/167 345/179 |
| 2014/0002422 A1* | 1/2014 | Stern ................... G06F 3/03545 345/179 |
| 2014/0253464 A1* | 9/2014 | Hicks .................. G06F 3/03545 345/173 |

FOREIGN PATENT DOCUMENTS

| JP | 2000-207115 | 7/2000 |
| JP | 2005-309482 | 11/2005 |
| JP | 2007-072555 | 3/2007 |
| JP | 2011-107854 | 6/2011 |

* cited by examiner

*Primary Examiner* — Abbas Abdulselam
(74) *Attorney, Agent, or Firm* — Cozen O'Connor

(57) ABSTRACT

A string-attached input pen including an input pen for a portable electronic device, and a string structural body, in which the string structural body has a first string section and a second string section, the first string section has a string-like member whose one end is coupled to the input pen and a ring member attached to the other end of the string-like member, and the second string section includes an annular belt, and the ring member is loosely inserted into the annular belt.

4 Claims, 5 Drawing Sheets

PRIOR ART

US 9,778,699 B2

STRING-ATTACHED INPUT AND PORTABLE ELECTRONIC DEVICE

CROSS-REFERENCE TO RELATED APPLICATION

This application is based upon and claims the benefit of priority from the prior Japanese Patent Application No. 2014-181904, filed Sep. 8, 2014, the entire contents of which are incorporated herein by reference.

BACKGROUND OF THE INVENTION

1. Field of the Invention

The present invention relates to a string-attached input device, and a portable electronic device. Specifically, the present invention relates to a string-attached input device that is used for an input operation on a touch panel and the like, and a portable electronic device provided with the touch panel.

2. Description of the Related Art

Input pens are input means for portable electronic devices provided with a touch panel and the like. Generally, this input pen is structured by a pen tip portion being formed at an end of its slender main body. The user thereof holds the main body with a hand, and brings the pen tip portion into contact with the input surface (a touch panel or the like) of a portable electronic device so as to perform a required input operation. However, when carrying the portable electronic device, the user sometimes loses the input pen by mislaying it.

One of the measures for preventing the loss is to accommodate the input pen in the body of the portable electronic device. However, it is not a secure measure because the user may forget to accommodate the input pen.

As another measure, there is a method where a portable electronic device and an input pen are tied by a string, namely, a method preparing "a string-attached input pen". For example, Japanese Patent Application Laid-Open (Kokai) Publication No. 2000-207115 discloses a method where one end side of a string having a predetermined length is attached to a rear end portion of an input pen (hereinafter referred to as "prior art"). In this prior art, the input pen and a portable electric device are always carried as a pair by the other end side of the string being attached to the portable electronic device, whereby the loss of the input pen can be prevented unfailingly.

However, although the prior art is effective for preventing the loss of an input pen, the string sometimes gets in the way of the operation of the input pen.

FIG. 5 is a diagram for explaining the inconvenience in the prior art. In this figure, an input pen 1 has been tied to a portable electronic device 3 by a string 2. When operating an input surface 4 of the portable electronic device 3, the user holds the input pen 1 with a hand to perform a required input operation. However, the string 2 sometimes becomes entangled with the user's fingertip and gets in the way. In such a case, before performing an input operation, the user is required to disentangle the string, which affects the input operation.

Accordingly, an object of the present invention is to provide a string-attached input pen and a portable electronic device by which loss of input pens are prevented and input operations are improved.

SUMMARY OF THE INVENTION

In accordance with one aspect of the present invention, there is provided a string-attached input pen comprising: an input pen for a portable electronic device; and a string structural body, wherein the string structural body has a first string section and a second string section, wherein the first string section has a string-like member whose one end has been coupled to the input pen and a ring member attached to the other end of the string-like member, and wherein the second string section includes an annular belt, and the ring member is loosely inserted into the annular belt.

In accordance with another aspect of the present invention, there is provided a portable electronic device attached with a string-attached input pen, wherein the string-attached input pen includes an input pen for a portable electronic device, and a string structural body, wherein the string structural body has a first string section and a second string section, wherein the first string section has a string-like member whose one end is coupled to the input pen and a ring member attached to the other end of the string-like member, wherein the second string section includes an annular belt, and the ring member is loosely inserted into the annular belt, and wherein the annular belt is attached to an attaching section provided in the portable electronic device with the ring member being loosely inserted into the annular belt.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

Hereafter, an embodiment of the present invention will be described with reference to the drawings.

Figure 1A:
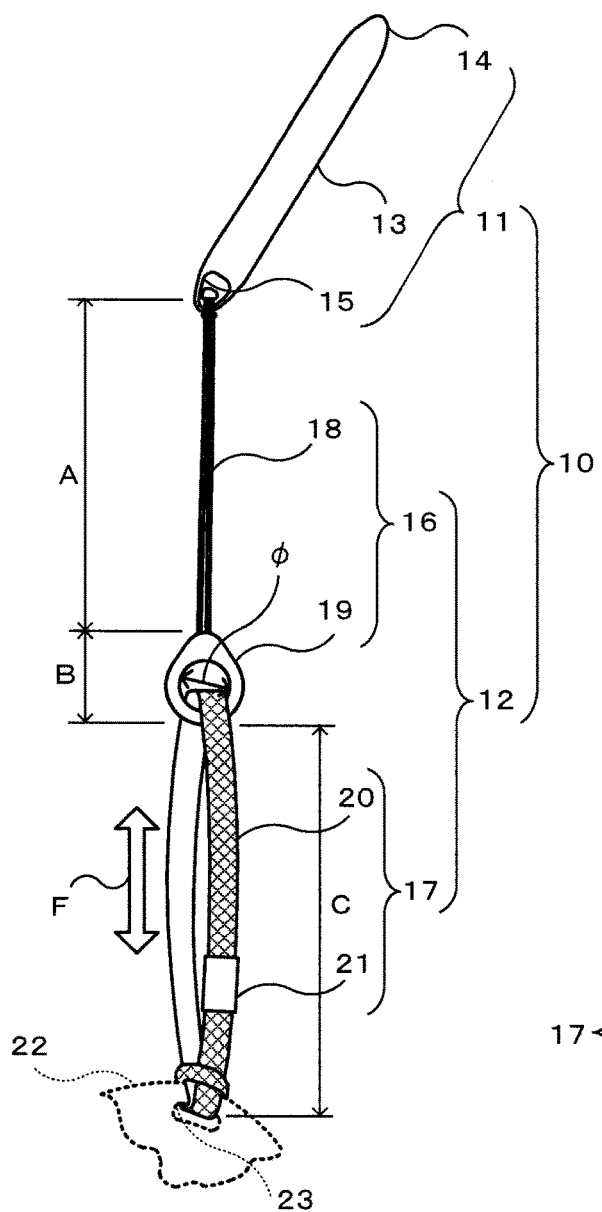
FIG. 1A to FIG. 1C are overall structural diagrams of a string-attached input pen 10 according to an embodiment.
Figure 1B:
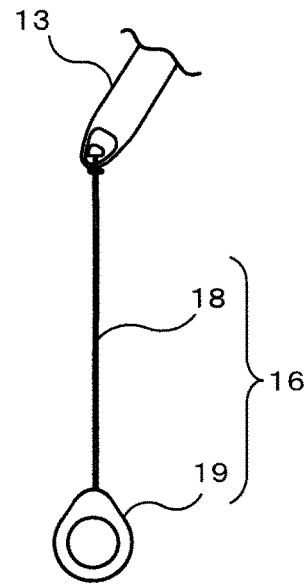
Figure 1C:
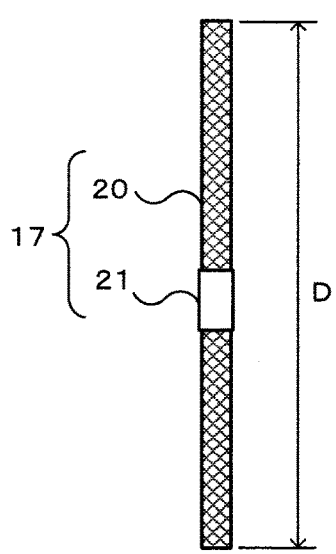

FIG. 1A to 1C are overall structural diagrams of a string-attached input pen 10 according to the embodiment. The string-attached input pen 10 in FIG. 1A is structured by an input pen 11 and a string structural body 12. The input pen 11 has a pen tip section 14 formed at a tip end portion of an input pen main body section 13 having a short-axis cylindrical shape imitating a writing tool such as a pencil, and a small hole (a string-like member coupling section 15) formed in a rear end of the input pen main body section 13.

The string structural body 12 is structured by a first string section 16 and a second string section 17, and the first string section 16 has a string-like member 18 (a double string) and a ring member 19 attached to one end of the string-like member 18. The input pen main body section 13 is coupled to the string-like member 18 of the first string section 16 through the small hole (the string-like member coupling section 15) at the rear end.

Here, the length (the length of the tensioned string-like member 18 from the small hole (the string-like member coupling section 15) to the ring member 19) of the string-like member 18 is represented as "A", and a proper value of "A" is a value by which the string-like member 18 does not gets in the way when the user uses the input pen 11 to perform an input operation. Specifically, this value, for example, "A"=about 155 mm, may be acquired through an experiment targeted at a number of subjects covering various age groups (from a child to an adult) and genders.

Figure 2:
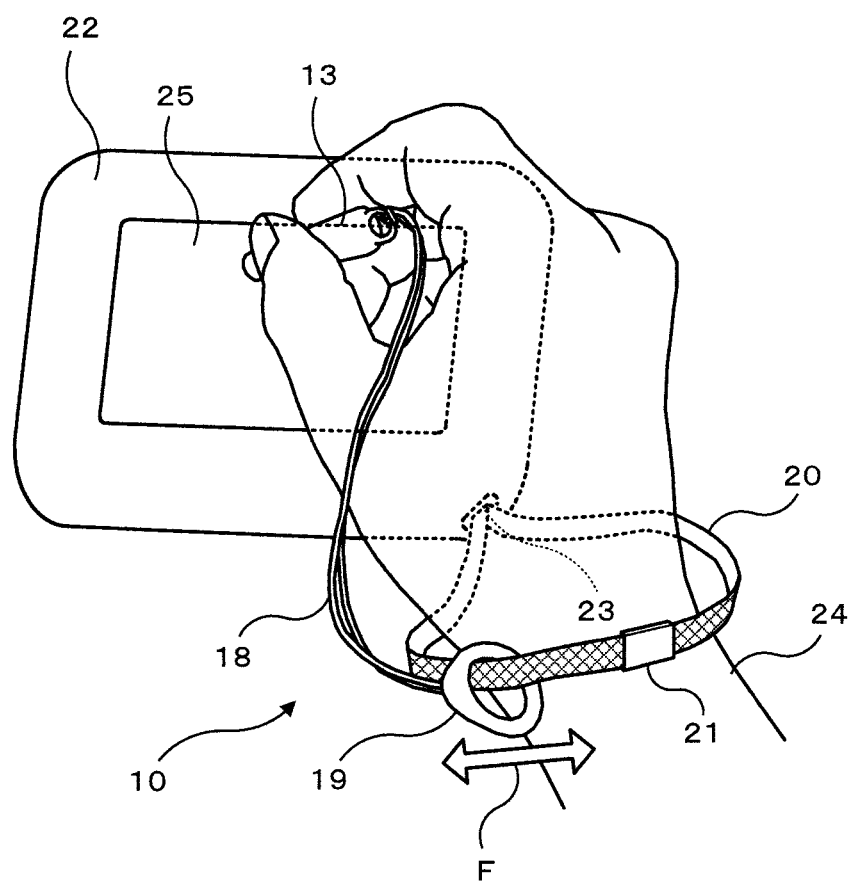
FIG. 2 is a diagram of a usage state of the string-attached input pen 10.

The second string section 17 is an annular belt 20 formed annularly (in a loop-like manner) by both ends of a wide band-like belt made of a high-strength material having flexibility (for example, a knitted material of fibers, etc.) being connected to each other by a joining member 21, and the annular belt 20 is structured such that the ring member 19 is loosely inserted into the annular belt 20 with one end of the annular belt 20 being attached to an attaching section 23 at one end of the portable electronic device 22, as shown in FIG. 2.

Here, the "loose insertion" means that the ring member 19 can be freely moved along the circumferential direction (directions indicated by white arrow F) of the belt 20 of the second string section 17. Specifically, the "loose insertion" indicates a state in which, when the inner diameter of the ring of the ring member 19 is represented as φ, this φ is sufficiently larger than the width of the belt 20. Also, when the maximum outer diameter size of the ring member 19 is represented as "B", this "B" is as a matter of course larger than the inner diameter φ of the ring of the ring member 19. For example, B may be about 23 mm.

Note that the string-like member 18 of the first string section 16 is not limited to the "double" string. The string-like member 18 may be a multiple string whose number of strings is larger than that of the double string, or one string (see FIG. 1B). Alternatively, although not illustrated, the string-like member 18 may be constituted by a braid acquired by twisting a plurality of strings together. That is, it may be constituted by any member as long as it is hard to cut and excellent in flexibility.

The string-attached input pen 10 having the above-described structure is used together with an arbitrary portable electronic device 22 (such as a portable game machine, a portable communication terminal, a multifunction type portable phone, a portable electronic dictionary, and the like although not limited particularly). Here, it is used with the belt 20 of the second string section 17 of the string-attached input pen 10 being attached (tied) to the attaching section 23 (the small hole) formed at one end of the portable electronic device 22.

Here, the length of the belt 20 tied to the body of the portable electronic device 22 is represented as "C", and a proper value of the "C" is a value by which the user's hand can pass through the ring of the belt 20, as shown in FIG. 2. This value, for example, "C"=about 130 mm, may also be acquired through an experiment targeted at a number of subjects covering various age groups and genders. When such a value ("C"=130 mm) is adopted, the belt 20 has a size where a hand of each of many users can pass through the belt 20 smoothly regardless of age or gender, and a baby's small head cannot enter the belt 20. Accordingly, an accident caused by a baby's small head entering the belt 20 and the belt 20 winding around the neck can be avoided.

In addition, the length of the belt 20 of the second string section 17 from one end thereof to the other end thereof when the belt 20 of the second string section 17 has been detached from the body of the portable electronic device 22 folded flat is represented as "D" (see FIG. 1C), and the value of "D" may be set such that "D"=about 175 mm.

FIG. 2 is a diagram of a usage state of the string-attached input pen 10. In this figure, the annular belt has been attached to one end of the portable electronic device with the ring member 19 being loosely inserted in the annular belt 20. When using the string-attached input pen 10 tied to the portable electronic device 22, the user inserts his or her hand (wrist 24) into the ring (an inside) of the belt 20 to hold the input pen 13 with the hand (finger tips), and then operates the input surface 25 (a touch panel, etc.) of the portable electronic device 22 by the input pen 13. Here, the string-attached input pen 10 of the embodiment has the following advantageous effects.

(1) Since the user's hand (wrist 24) has been inserted into the ring of the belt 20 tied to the small hole 23 of the portable electronic device 22, the portable electronic device 22 is prevented from falling.

(2) Since the belt 20 has been "loosely inserted" into the ring (an inside) of the ring member 19 of the first string section 16 with one end of the belt 20 of the second string section 17 being attached to the portable electronic device 22, the string-like member 18 of the first string section 16 does not get in the way of the operation of the pen 10 when the user's hand is inserted into the annular belt and the user operates the portable electronic device 22 by the input pen 11. This is because the ring member 19 can freely move along the circumferential direction (the direction of the outlined arrow F) of the belt 20 and the string-like member 18 can be prevented from becoming entangled with a fingertip and the like.

As described above, the string-attached input pen 10 of the embodiment has been attached to the portable electronic device 22 by the string structural body 12. Therefore, the loss of the input pen 13 can be prevented. In addition, since the string-like member 18 can be prevented from becoming entangled as described in (2) and input operations can be improved thereby, at least the object of the present invention "to provide a string-attached input pen and a portable electronic device by which loss of an input pen is prevented and input operations are improved" can be achieved.

In the above-described embodiment, the "wide band-like" belt 20 has been used in the second string section 17 so as to reduce a burden on the user's wrist. However, this is to show practical convenience, and the concept of the present invention is not limited to the "wide band-like" belt. For example, the belt 20 may be a string or the like.

Figure 3A:
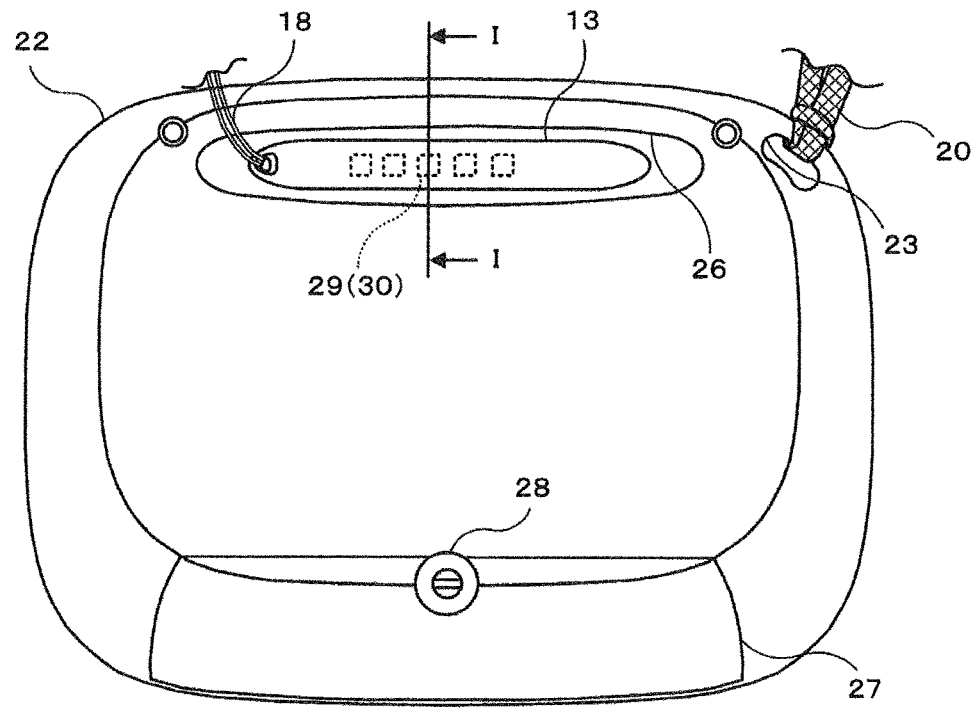
FIG. 3A to FIG. 3C are back views of a portable electronic device 22.
Figure 3B:
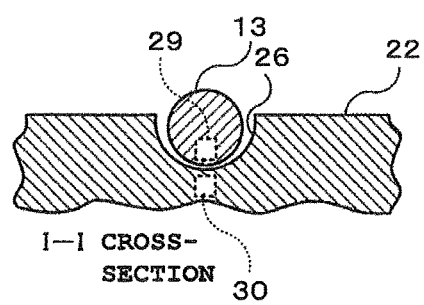
Figure 3C:
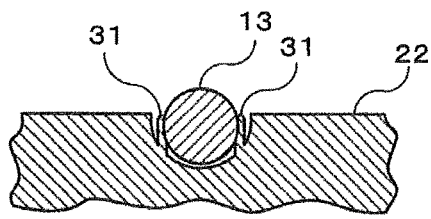

FIG. 3A to FIG. 3C are back views of the portable electronic device 22. As shown in FIG. 3A, the back surface of the portable electronic device 22 is formed into a substantially rectangular shape, and the attaching section 23 (the attaching hole) is formed in the vicinity of a corner of the rectangle. From the vicinity of this attaching section 23, a recessed long groove 26 is formed substantially in parallel with one side of the rectangle, and the input pen 13 is accommodated and held in this long groove 26. In addition, a battery lid 27, a lid opening/closing knob 28, and the like are provided on the back face of the portable electronic device 22.

In order to detachably hold the input pen 13 in the accommodated state, one or plural (five in FIG. 3A, but the number is not limited thereto) permanent magnets 29 are provided inside the input pen 13, and permanent magnets 30 of the same number are provided on the back side of the long groove 26 (see FIG. 3B). By the unlike poles of the permanent magnets 29 and 30 being opposed to each other, the accommodation and the holding of the input pen 13 can be simultaneously performed by a single-touch operation. Alternatively, a structure may be adopted in which at least one pair of opposing claws 31 are formed upright in the long groove 26 (refer to FIG. 3C), and the input pen 13 is pinched and held by the pinching force of the opposing claws 31.

Figure 4:
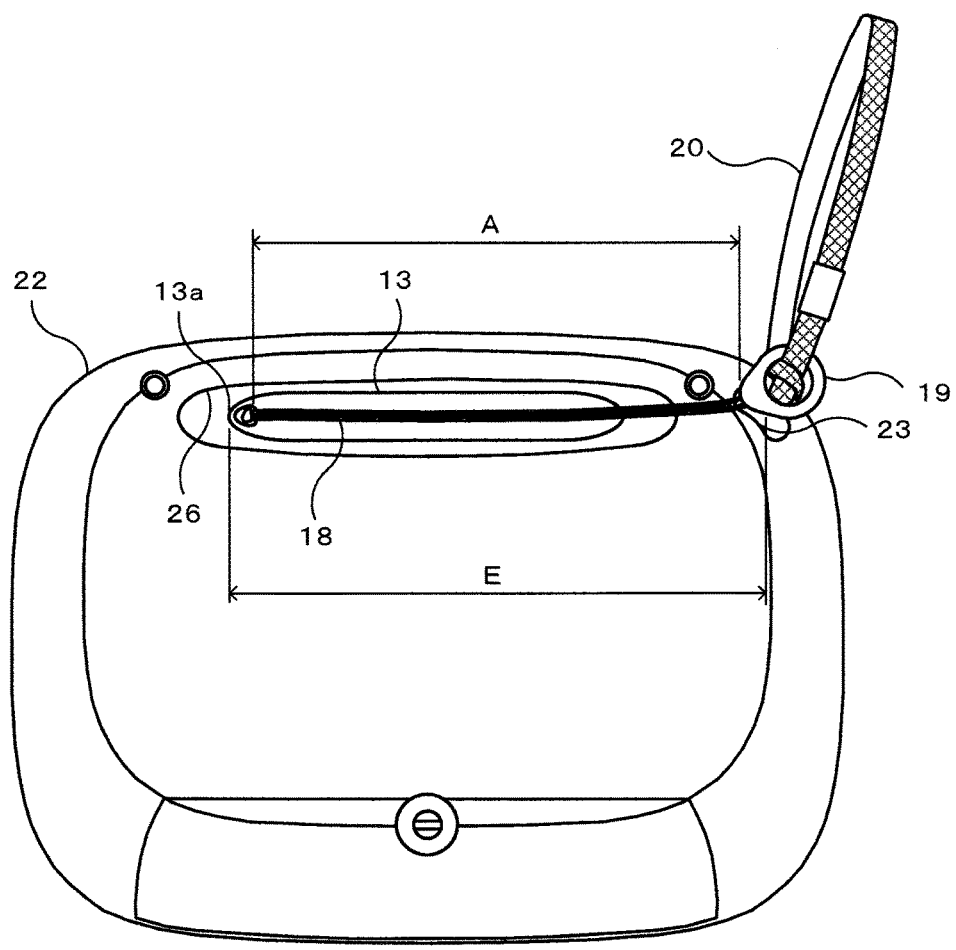
FIG. 4 is a view showing loosening of a double string 18.
Figure 5:
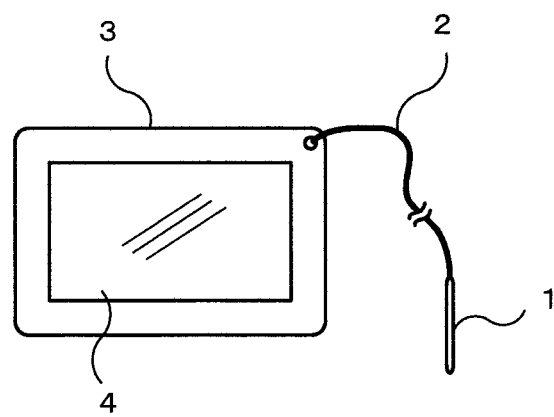
FIG. 5 is a diagram explaining the inconvenience of the prior art.

FIG. 4 is a diagram showing the loosening of the string-like member 18. As shown in this figure, the ring member 19 is loosely inserted into the attaching section 23 side of the annular belt 20 such that the holding means can hold the input pen 11 with one end of the input pen 11 being positioned between the coupling section 15 coupling the string-like member 18 and the attaching section 23 so that the string-like member 18 does not sag as compared to the state where the permanent magnets 30 constituting the holding means have held the input pen 11 such that the coupling section 15 coupling one end of the input pen 11 with the string-like member 18 is positioned between the other end (the tip portion 14 of the pen) of the input pen 11 and the attaching section 23. That is, the string-like member 18 is formed such that, in the state where the main body section 13 of the input pen 11 has been held by the permanent magnets 29 and 30 constituting the holding means with the pen tip end 14 being positioned near the attaching section 23, the loosening of the string-like member 18 is less than that of when the main body section 13 is held in the reverse direction. If there is much loosening, the string-like member 18 is caught when the portable electronic device 22 is being carried, and input pen 13 is unintentionally detached from the long groove 26.

The degree of loosening of the string-like member 18 in the accommodated state is determined based on a relationship between the length "A" of the string-like member 18 and a distance "E" from the attaching section 23 (the small hole) of the portable electronic device 22 to a rear end portion 13a of the main body section 13 of the input pen in the accommodated state. When "A" is too long as compared to "E", the loosening becomes large, and therefore "E" is required to be set properly in view of "A", or "A" is required to be set properly in view of "E". In the case of E=A, the loosening becomes zero.

While the present invention has been described with reference to the preferred embodiment, it is intended that the invention be not limited by any of the details of the description therein but includes all the embodiments which fall within the scope of the appended claims.

What is claimed is:

1. A portable electronic device attached with a string-attached input pen, wherein the string-attached input pen includes an input pen for a portable electronic device, and a string structural body,
   wherein the string structural body has a first string section and a second string section,
   wherein the first string section has a string-like member whose one end has been coupled to the input pen by a coupling section and a ring member attached to the other end of the string-like member,
   wherein the second string section includes an annular belt, and the ring member has been loosely inserted into the annular belt,
   wherein the annular belt has been attached to an attaching section provided in the portable electronic device with the ring member being loosely inserted into the annular belt,
   wherein the portable electronic device comprises a holding section which detachably holds the string-attached input pen, and
   wherein the ring member is loosely inserted into an attaching section side of the annular belt such that the holding section is capable of holding the input pen with one end of the input pen being positioned between the coupling section and the attaching section so that the string-like member does not sag as compared to a state where the holding section has held the input pen such that the coupling section coupling one end of the input pen with the string-like member is positioned between the other end of the input pen and the attaching section.

2. The portable electronic device according to claim 1, wherein the ring member is loosely inserted into the annular belt such that the string-like member and the ring member are movable to an area where the string-like member, coupled to the input pen, and the ring member, attached to the string-like member, do not block an operation of the input pen when a hand of a user is inserted into inner side of the annular belt and the input pen is operated by the hand of the user in a state where the annular belt is attached to the portable electronic device.

3. The portable electronic device according to claim 2, wherein the holding section holds the string-attached input pen by a magnetic force of a magnet.

4. The portable electronic device according to claim 2, wherein the holding section holds the string-attached input pen by a pinching force of at least one pair of opposed claws.

* * * * *